US006625892B2

(12) United States Patent
Takahashi et al.

(10) Patent No.: US 6,625,892 B2
(45) Date of Patent: Sep. 30, 2003

(54) RECIPROCATING CUTTING TOOLS (75) Inventors: Yuji Takahashi, Anjo (JP); Hirotomo Inayoshi, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/955,305

(22) Filed: Sep. 19, 2001

(65) Prior Publication Data
US 2002/0032968 A1 Mar. 21, 2002

(51) Int. Cl.⁷ ................................................ B23D 49/10
(52) U.S. Cl. ............................. 30/393; 30/392; 30/394
(58) Field of Search ......................... 30/392, 393, 394; 83/699.21, 758

(56) References Cited

U.S. PATENT DOCUMENTS

| 1,542,127 A | * | 6/1925 | Hastings | 30/377 |
| 2,746,493 A | * | 5/1956 | Babcock | 30/394 |
| 3,204,470 A | * | 9/1965 | Brucker | 30/392 |
| 3,212,938 A | | 10/1965 | Neuhardt et al. | |
| 3,236,111 A | * | 2/1966 | Naslund | 30/392 |
| 3,863,342 A | * | 2/1975 | Griffies et al. | 30/393 |
| 4,238,884 A | * | 12/1980 | Walton, II | 30/393 |
| 4,628,605 A | * | 12/1986 | Clowers | 30/393 |
| 5,638,945 A | | 6/1997 | Fukinuki et al. | |
| 6,181,032 B1 | | 1/2001 | Marshall et al. | |

FOREIGN PATENT DOCUMENTS

DE              3825654          2/1990

* cited by examiner

Primary Examiner—Hwei-Siu Payer
(74) Attorney, Agent, or Firm—Dennison, Schultz & Dougherty (57) ABSTRACT

A reciprocating cutting tool (1, 50) includes a slider (14, 51) that reciprocates linearly in a first direction. A rod or blade holder shaft (21) is movable with the slider (14, 51) in the first direction and is supported by the slider (14, 51) such that the rod or blade holder shaft (21) is movable in a second direction that is different from the first direction. A blade (B) can be mounted on the rod or blade holder shaft (21). The rod or blade holder shaft (21) is movable in the second direction independently of the movement of the slider (14, 51) in the first direction.

53 Claims, 5 Drawing Sheets

FIG. 6
PRIOR ART

RECIPROCATING CUTTING TOOLS

This application claims priority to Japanese application serial number 2000-283964, which application is hereby incorporated by reference herein in its entirety.

BACKGROUND OF THE INVENTION

1. Field of the Invention

The present invention relates to reciprocating cutting tools, such as jigsaws, that have a reciprocating saw blade for cutting workpieces.

2. Description of the Related Art

Known jigsaws comprise a rotating electric motor as a drive source and a motion conversion mechanism that converts the rotation of the motor into linear reciprocating movement of a blade. Japanese Laid-Open Utility Model Publication No. 4-54801 teaches a motion conversion mechanism for a jigsaw and this mechanism will now be described with reference to FIG. 6, which substantially corresponds to FIG. 1 from that Japanese publication.

Figure 6:
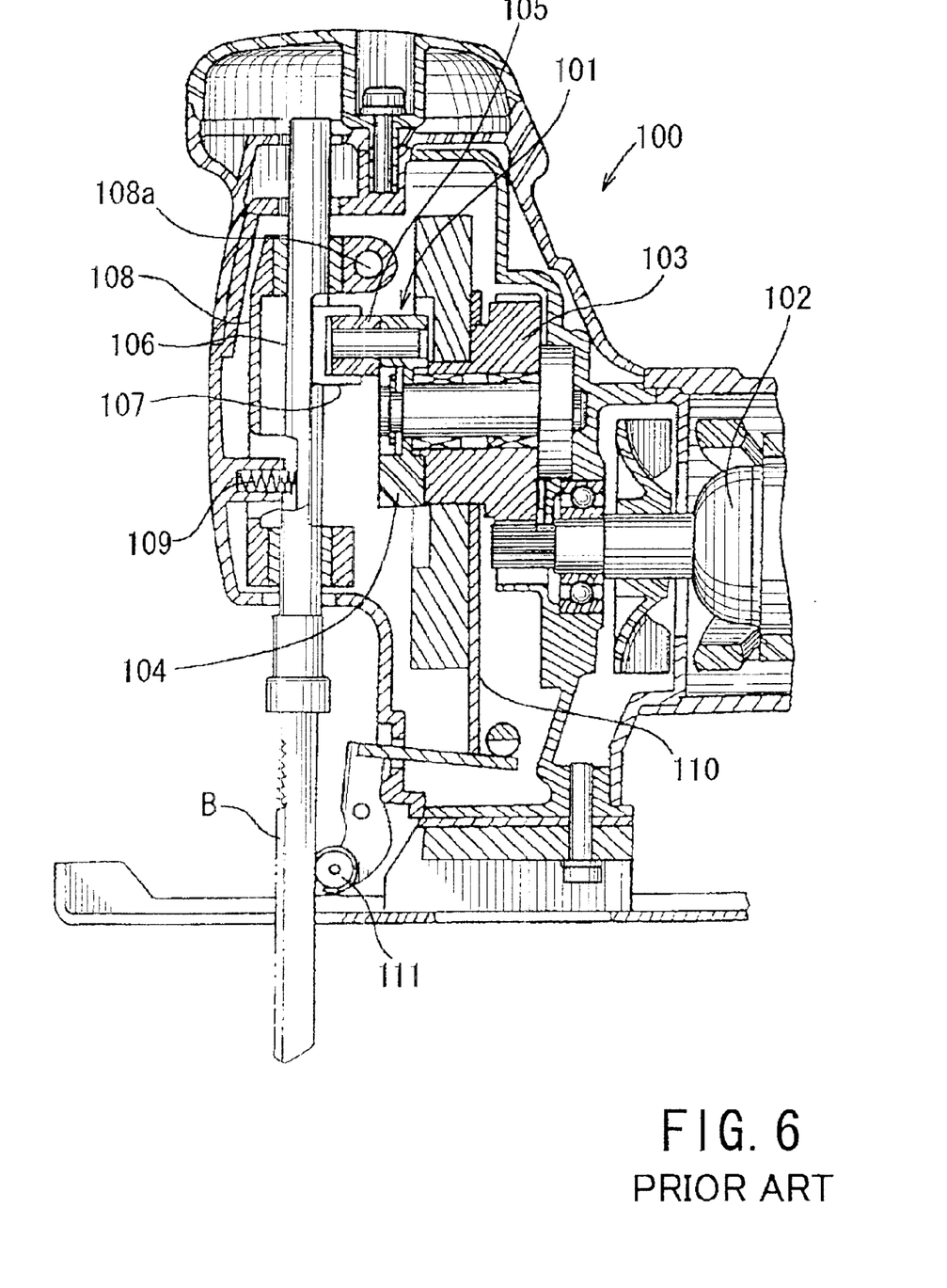
FIG. 6 is a vertical cross-section of the internal structure of a front portion of a known jigsaw, which view substantially corresponds to FIG. 1 of Japanese Laid-Open Utility Model Publication No. 4-54801.

As shown in FIG. 6, a jigsaw 100 includes a motion conversion mechanism 101 that has a crank disk 104. The crank disk 104 is rotatably driven by an electric motor 102 via an intermediate gear 103. A guide roller 105 is mounted on the crank disk 104 in a position displaced from the center of rotation of the crank disk 104. Therefore, the guide roller 105 revolves around the rotational axis of the crank disk 104, while the guide roller 105 also can rotate around its own axis. The guide roller 105 engages a horizontal engagement recess formed in a slider 107 that is fixed onto a vertical rod 106. Therefore, as the crank disk 104 rotates, the guide roller 105 reciprocally moves along the horizontal recess of the slider 107. Thus, the guide roller 105 imparts to the rod 106 a vertical reciprocating component of the rotating movement of crank disk 104. However, the horizontal reciprocating component of the rotating movement of the crank disk 104 is not imparted to the rod 106. Therefore, the rod 106 linearly reciprocates in the vertical direction with respect to the workpiece and the jigsaw 100.

A rod holder 108 vertically slidably supports the rod 106. An upper end of the rod holder 108 is connected to the body of the jigsaw 100 and can pivot about a horizontal axis by means of a pivot shaft 108a. A compression spring 109 serves to bias the lower portion of the rod holder 108 in a rearward direction, which direction is opposite to the moving direction (forward direction) of the jig saw 100 during the cutting operation.

A cam plate 110 is mounted on the intermediate gear 103. A biasing roller 111 is coupled to the cam plate 110, such that the biasing roller 111 reciprocates in the horizontal direction (forward and rearward directions) as the cam plate 110 rotates. Therefore, the blade B mounted on the lower end of the rod 106 is reciprocally pressed forwardly by the biasing roller 111, as the cam plate 110 rotates. The biasing force of the biasing roller 111 counters or opposes the biasing force of the compression spring 109.

According to this arrangement, because the rod holder 108 is pivotally supported by the pivot shaft 108a, the blade B may be prevented from twisting during the cutting operation and the blade B can reciprocally move both in the vertical direction and the forward and rearward directions. That is, the blade B can substantially move in an orbital path with respect to the workpiece and the jigsaw 100.

However, problems exist with the design of the known jigsaw 100. For example, because the slider 107 pivots forward and rearward together with the rod 106, a clearance must be provided between the horizontal engagement recess of the slider 107 and the guide roller 105 in order to permit the slider 107 to incline relative to the guide roller 105. Because of the presence of such a clearance, the guide roller 105 cannot move smoothly along the engagement recess of the slider 107. Instead, the guide roller 105 will oscillate in the vertical direction between the upper and lower edges of the slider 107. The motion conversion mechanism 101 will generate vibrations and sounds, due to the guide roller 105 repeatedly contacting and rattling between the edges of the slider 107. Because these vibrations will be transmitted to the operator who is holding the jigsaw 100 while performing a cutting operation, the vibrations may fatigue the operator.

Another known motion conversion mechanism for a jigsaw is taught in U.S. Pat. No. 3,236,111. This conversion mechanism also utilizes a slider that engages a guide roller. Thus, the slider will reciprocate in the vertical direction as the guide roller revolves. However, a rod, on which a blade is mounted, is connected to the slider such that the rod can pivot relative to the slider in the forward and rearward directions. In addition, in order to reciprocate the rod (or the blade mounted on the rod) in the forward and rearward directions, the slider moves in the forward and rearward directions as the slide moves vertically. Therefore, during the cutting operation, the slider may receive a reaction force from a workpiece via the blade and the rod. As a result, the slider will pivot or incline relative to the guide roller and the guide roller will not smoothly move relative to the slider.

SUMMARY OF THE INVENTION

It is, accordingly, one object of the present invention to teach improved reciprocating cutting tools. For example, in one aspect of the present teachings, vibrations and noise may be reduced during the cutting operation.

According to one embodiment of the present teachings, a reciprocating cutting tool may include a slider that can reciprocate linearly in a first direction. A rod or blade shaft holder is movable with the slider in the first direction and is supported by the slider, such that the rod or blade shaft holder is movable in a second direction that is different from the first direction. A blade can be mounted on the rod (blade shaft holder) and the rod (blade shaft holder) is movable in the second direction independently of the movement of the slider in the first direction.

In a preferred embodiment, the first direction is a vertical direction with respect to a workpiece and the second direction is a horizontal direction (i.e., forward and rearward directions) of the workpiece. The blade may be moved in the forward direction to cut the workpiece during the cutting operation. Thus, the blade may substantially move along an orbital path with respect to the workpiece during the cutting operation.

Because the rod (blade shaft holder) is movable in the second direction independently of the movement of the slider in the first direction, the slider only moves in the first direction and preferably the slider does not move or incline in the second direction. Therefore, rattling is preferably reduced between the slider and a drive mechanism, which may be included within a motion conversion mechanism, because the motion conversion mechanism preferably does not move in the second direction. As a result, vibrations and noise that result from such rattling may be considerably reduced.

According to another embodiment of the present teachings, reciprocating cutting tools, such as a jig saw, may include a motor generating a rotational output, which rotational output is ultimately utilized to drive a blade in an orbital path with respect to a workpiece. A first means may be provided for converting the rotational output of the motor into linear reciprocating movement in a first plane. A second means also may be provided for transmitting the linear reciprocating movement to the blade. The second means may be, e.g., pivotally coupled to the first means and fixedly coupled to the blade. Preferably, the second means can reciprocate in the first plane and in a second plane that is substantially perpendicular to the first plane. Thus, the blade may preferably move an orbital path within the second plane. However, the first means preferably does not substantially move in the second plane.

In another embodiment, the first plane may comprise a vertical cutting direction with respect to the workpiece. Further, the second plane may comprise (i) a forward direction for pressing the blade against the workpiece during the cutting operation and (ii) a rearward direction opposite to the forward direction. In another embodiment, the first means may comprise a slider that is slidably received within a guide block. Preferably, the slider can slide with respect to the guide block in the first plane, but the guide block prevents the slider from inclining or rattling in the second plane. The guide block may optionally be fixed in position within respect to a housing of the cutting tool.

A support pin may pivotally couple the first means to the second means. Optionally, a pair of bearings may rotatably support the support pin. The second means may include a rod (or blade holder shaft) that is prevented from rotating about a longitudinal axis of the rod (blade shaft holder), for example, by a fixed bush. A biasing roller may contact the blade or the blade mounting shaft in the second plane, so as to reciprocally move in the second plane in synchronism with the reciprocating movement of the first means in the first plane.

In another embodiment of the present teachings, reciprocating cutting tools may include a motor that generates a rotational output, which rotational output may be utilized to drive the blade in an orbital path with respect to the workpiece. A motion conversion mechanism may be coupled to the motor, so as to convert the rotational output into a substantially linear output. Further, a slider may be coupled to or incorporated within the motion conversion mechanism. Preferably, the slider linearly reciprocates in a first plane when the motor is driven, but substantially does not move in a second plane that is substantially perpendicular to the first plane. A blade mounting shaft may be pivotally coupled to the slider. Preferably, the blade mounting shaft reciprocates in the second plane in order to impart an orbital cutting motion to the blade.

The present teachings also provide means for biasing the blade mounting shaft, or a blade attached to the blade mounting shaft, in the second plane. In addition, the present teachings further provide means for preventing the blade (or the blade mounting shaft) from rotating or twisting during a cutting operation.

Additional objects, features and advantages of the present invention will be readily understood after reading the following detailed description together with the accompanying drawings and the claims.

DETAILED DESCRIPTION OF THE INVENTION

In further embodiments of the present teachings, reciprocating cutting tools, such as jigsaws, may include a slider that reciprocates linearly in a substantially vertical direction relative to a workpiece to be cut. A rod or blade holder shaft may be coupled to and move with the slider in the vertical direction. Further, the rod or blade holder shaft also may be pivotally coupled to the slider such that the rod or blade holder shaft can move or pivot in a horizontal direction or forward and rearward directions. A cutting tool implement, such as a blade, may be mounted on the rod or blade holder shaft. Therefore, workpiece may be cut by the cutting tool implement (e.g., a blade) as the cutting tool implement is pressed forward against the workpiece.

The rod or blade holder shaft may move in the forward and rearward directions independently of the vertical movement of the slider. Therefore, the slider may be smoothly moved by a variety of known drive mechanisms, such as a motion conversion mechanism that converts the rotation of the motor into a reciprocating movement of the slider, because the slider does not oscillate (rattle) in the vertical direction. As a result, vibrations and noise may be considerably reduced and operator fatigue may be reduced during the cutting operation. Preferably, the cutting tool implement or the blade may be moved in the forward direction in order to press the blade against a workpiece during a cutting operation.

In one representative embodiment, a guide block may serve as a guide for the slider, so that the slider slidably moves along the guide block in the vertical direction. The guide block also may serve to prevent the slider from inclining relative to the vertical direction. Therefore, the guide block ensures that the slider moves (e.g., linearly reciprocates) only in the vertical direction. Preferably, the guide block may be fixed within the cutting tool housing.

In another representative embodiment, the slider may include opposite lateral edges that extend substantially in parallel to the vertical direction. A pair of guide recesses may be formed within the guide block and may receive the respective lateral edges of the slider without substantial clearance. Therefore, movement of the slider in the forward and rearward directions or inclination of the slider relative to the vertical direction may be reliably prevented. As a result, the slider may be accurately and reliably guided in the vertical direction, so that the vibrations and noise may be further reduced.

In another representative embodiment, the slider may support the rod such that the rod can pivot in the forward and rearward directions. Preferably, a support pin pivotally couples the rod to the slider, so that the rod can pivot in the horizontal plane relative to the slider. The slider may further include a pair of bearings that rotatably support the support pin. The opposite lateral edges of the slider may comprise bearings. Therefore, the slider can smoothly reciprocate relative to the guide block.

Preferably, the rod may be prevented from rotating around a longitudinal axis of the rod. In that case, rotation or twisting of the rod and blade, which may be mounted on the rod, can be reliably prevented. As a result, undesirable deflection of the blade from the intended cutting path also can be reliably prevented. For example, a fixed bush may be provided that includes a support hole and the rod preferably extends through the support hole. A clearance may be provided between the rod and an inner wall of the support hole in order to permit the rod to move relative to the bush in the forward and rearward directions. The support hole of the bush may, e.g., have a non-circular configuration. In that case, the rod also may have a non-circular outer peripheral surface that corresponds to the configuration of the support hole. For example, the support hole of the bush as well as the peripheral surface of the rod may, e.g., have a substantially rectangular configuration.

The cutting tool may further include a motor and a motion conversion mechanism that converts rotational energy generated by the motor into the linear reciprocating movement of the slider. A variety of suitable motion conversion mechanisms are known in the art. Thus, any type of arrangement that generates reciprocal up and down motion can be used in accordance with the principles of the present teachings. Herein, the terms "up and down motion" and "vertical motion" are intended that to include rectilinear up and down (vertical) motion as well as orbital up and down (vertical) motion.

In one representative embodiment, the motion conversion mechanism may include a crank disk that is adapted to be rotatably driven by the motor. The structure "crank disk" is also known in the art as a crank block or cam block and these terms may be used interchangeably. Further, a guide roller may be mounted on the crank disk and may have a rotational axis that is displaced from the rotational axis of the crank disk. Thus, the guide roller will revolve around the rotational axis of the crank disk when the motor is driven. An engagement recess may be formed in the slider and may engage the guide roller. Preferably, the engagement recess may extend substantially in the horizontal direction and engage the slider without a substantial clearance.

Because the slider can move only in the vertical direction without moving or inclining in the forward and rearward directions, the guide roller can be designed so that the guide roller does not rattle within the engagement recess of the slider in the vertical direction. Therefore, vibrations and noise that may be produced due to impact of the guide roller against opposing inner walls of the engagement recess may be considerably reduced.

In another representative embodiment, a biasing or backup roller may contact the cutting tool implement (e.g. a blade) or the rod (blade shaft holder) in the forward direction. The biasing or backup roller also may reciprocally move in the forward and rearward directions in synchronism with reciprocating movement of the slider in the vertical direction.

A variety of motors are well known in the art and can be utilized to drive the motion conversion mechanisms of the present teachings. Naturally, for portable power tool use, electric motors are preferable, although the present teachings are not limited to electric motors. An electric motor may, for example, be disposed within a motor housing and may include an armature portion that is rotatably mounted within a field portion. The armature portion may preferably include a pinion gear and a fan for cooling the motor and other parts of the reciprocating cutting tool.

Each of the additional features and method steps disclosed above and below may be utilized separately or in conjunction with other features and method steps to provide improved reciprocating cutting tools and methods for designing and using such reciprocating cutting tools. Representative examples of the present invention, which examples utilize many of these additional features and method steps in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and dependent claims may be combined in ways that are not specifically enumerated in order to provide additional useful embodiments of the present teachings.

A first representative embodiment of a reciprocating cutting tool will now be described with reference to FIGS. 1 to 3. In this representative embodiment, the reciprocating cutting tool may be a jigsaw 1, and a front portion of the jigsaw 1 is shown in a vertical cross-sectional view in FIG. 1. The jigsaw 1 may have a hollow body housing 2 and a hollow gear casing 4. The gear casing 4 may be joined to the front end (left end as viewed in FIG. 1) of the body housing 2. The body housing 2 may have a substantially cylindrical configuration and may also serve as a grip portion that may be grasped by the operator during the cutting operation. The drive source may include an electric motor 3 that is disposed within the body housing 2 and may have an output shaft 3a that extends into the gear casing 4.

A fan 5 may be attached to the output shaft 3a and may serve to cool the motor 3. A buffer plate 6 may be attached to the inner wall of the front end of the body housing 2 so as to surround the fan 5. The buffer plate 6 may direct or control a flow of cooling air within the body housing 2. The output shaft 3a may be rotatably supported by the inner wall of the gear casing 4 by means of a bearing 7.

A gear 3b may be formed on the front end of the output shaft 3a and may engage an intermediate gear 8. A support shaft 9 that is secured to the inner wall of the gear casing 4 may rotatably support the intermediate gear 8. A first eccentric boss 8a may be formed integrally with the front surface (left surface as viewed in FIG. 1) of the intermediate gear 8. A second eccentric boss 8b may be formed integrally with the rear surface (right surface as viewed in FIG. 1) of the intermediate gear 8. Each of the first and second eccentric bosses 8a and 8b may have a central axis that is displaced from the rotational axis of the intermediate gear 8. However, both axes of the first and second eccentric boss 8a and 8b may be positioned on the same side with respect to the rotational axis of the intermediate gear 8. In other words, the axes of the first and second eccentric boss 8a and 8b may be positioned on the same radius of the intermediate gear 8.

A balance plate (counterbalance) 11 may be rotatably fitted onto the first eccentric boss 8a. A vertically elongated guide slot 11a may be formed in the lower portion of the balance plate 11. A guide pin 13 may be slidably inserted into the guide slot 11a and may be fixed to the inner wall of the gear casing 4. Therefore, as the intermediate gear 8 rotates, the first eccentric boss 8a revolves about the rotational axis of the intermediate gear 8, so that the balance plate 11 reciprocates vertically and reciprocally pivots laterally around the axis of the guide pin 13.

Because the balance plate 11 moves vertically and pivots laterally during the cutting operation of the jigsaw 1, it provides a counter balance for the intermediate gear 8 in order to counter the crank movement of a guide roller 12, which will be further described below. As a result, vibrations and noise of the jigsaw 1 may be considerably reduced.

A cam plate 30 may be rotatably fitted onto the second eccentric boss 8b and the cam plate 30 also may reciprocate vertically and laterally as the intermediate gear 8 rotates. The operation of the cam plate 30 will be further explained below.

A crank disk 10 may be fixed to the front end of the first eccentric boss 8a and may rotate with the intermediate gear 8. A guide roller 12 may be rotatably mounted on the front surface of the crank disk 10 and may have a rotational axis that is displaced from the rotational axis of the crank disk 10 or the rotational axis of the intermediate gear 8. However, the rotational axis of the guide roller 12 may oppose the axis of the first eccentric boss 8a with respect to the rotational axis of the intermediate gear 8. In other words, the rotational axis of the guide roller 12 is positioned or displaced 180° from the axis of the first eccentric boss 8a The guide roller 12 may engage a horizontal recess 14c formed in a slider 14. The horizontal recess 14c may have a substantially U-shaped cross-section. The slider 14 may be vertically slidably supported by a guide block 15 that is fixed onto the front wall of the gear casing 4 by means of screws 16.

Figure 2:
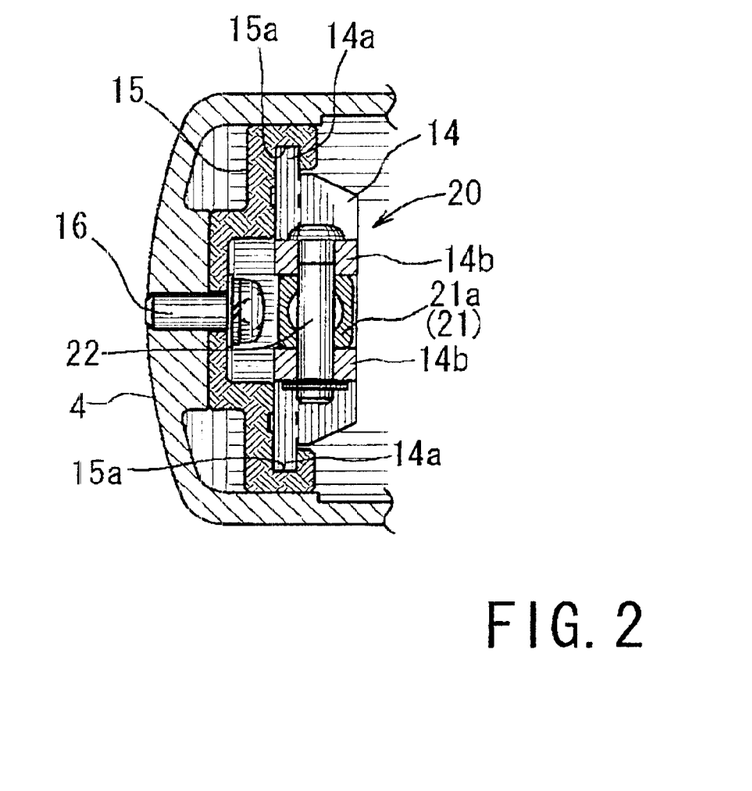
FIG. 2 is a horizontal cross-sectional view taken along line (2)—(2) in FIG. 1 and showing a representative arrangement for supporting a slider and also showing a representative arrangement for supporting a rod on the slider.

FIG. 2 shows a support structure for the guide block 15. As shown in FIG. 2, the slider 14 may have a pair of side edges 14a that may extend from both lateral sides (upper and lower sides as viewed in FIG. 2) of the slider 14. Further, the guide block 15 may have a pair of guide recesses 15a that are formed in both lateral portions of the guide block 15a and oppose each other in the lateral direction. The side edges 14a of the slider 14 may be received within the respective guide recesses 15a and the dimensions of the side edges 14a and the guide recesses 15a may be determined such that the slider 14 can slide vertically relative to the guide block 15 without rattling.

Therefore, when the motor 3 is started, the intermediate gear 8 rotates and the crank disk 10 also rotates with the intermediate gear 8, thereby causing the guide roller 12 to revolve about the axis of the support shaft 9 or the rotational axis of the intermediate gear 8. The vertical component of the movement of the guide roller 12 may serve to vertically move the slider 14. However, the horizontal component of the movement of the guide roller 12 preferably does not cause horizontal movement of the slider 14, because the guide roller 12 moves along the horizontal recess 14c of the slider 14. As a result, the slider 14 may reciprocate vertically as the guide roller 12 revolves. A rod (or blade holder shaft) 21 may be attached to the slider 14 and a blade B may be mounted on the rod 21. Therefore, the blade B also may reciprocate vertically.

Referring to FIG. 2, a lower portion of the slider 14 may have a pair of parallel support edges 14b that laterally oppose each other and extend in the vertical direction. The rod 21 may have an upper end 21a that is inserted between the support edges 14b. The upper end 21a may be pivotally supported on a support shaft 22 that extends between the support edges 14b. Thus, the rod 21 can pivot forward and rearward relative to the slider 14 around the support shaft 22.

Figure 3:
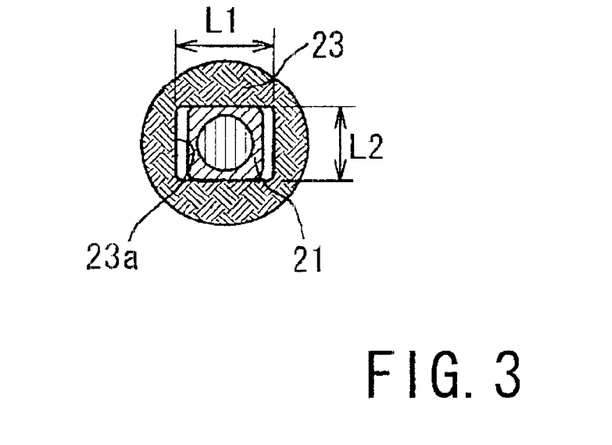
FIG. 3 is a sectional view taken along line (3)—(3) in FIG. 1 and showing a representative arrangement for supporting the rod by means of a bush.

As shown in FIGS. 2 and 3, the rod 21 may have, e.g., a prism shape with a square cross-section. Herein, "prism" is intended to generally mean a polyhedron having two polygonal faces lying in parallel planes and with the other faces forming parallelograms. The upper end 21a may be supported between the support edges 14b while closely and slidably contacting the support edges 14b. Thus, the rod 21 can pivot in the forward and rearward directions without rattling in a circumferential direction about its longitudinal axis.

Figure 1:
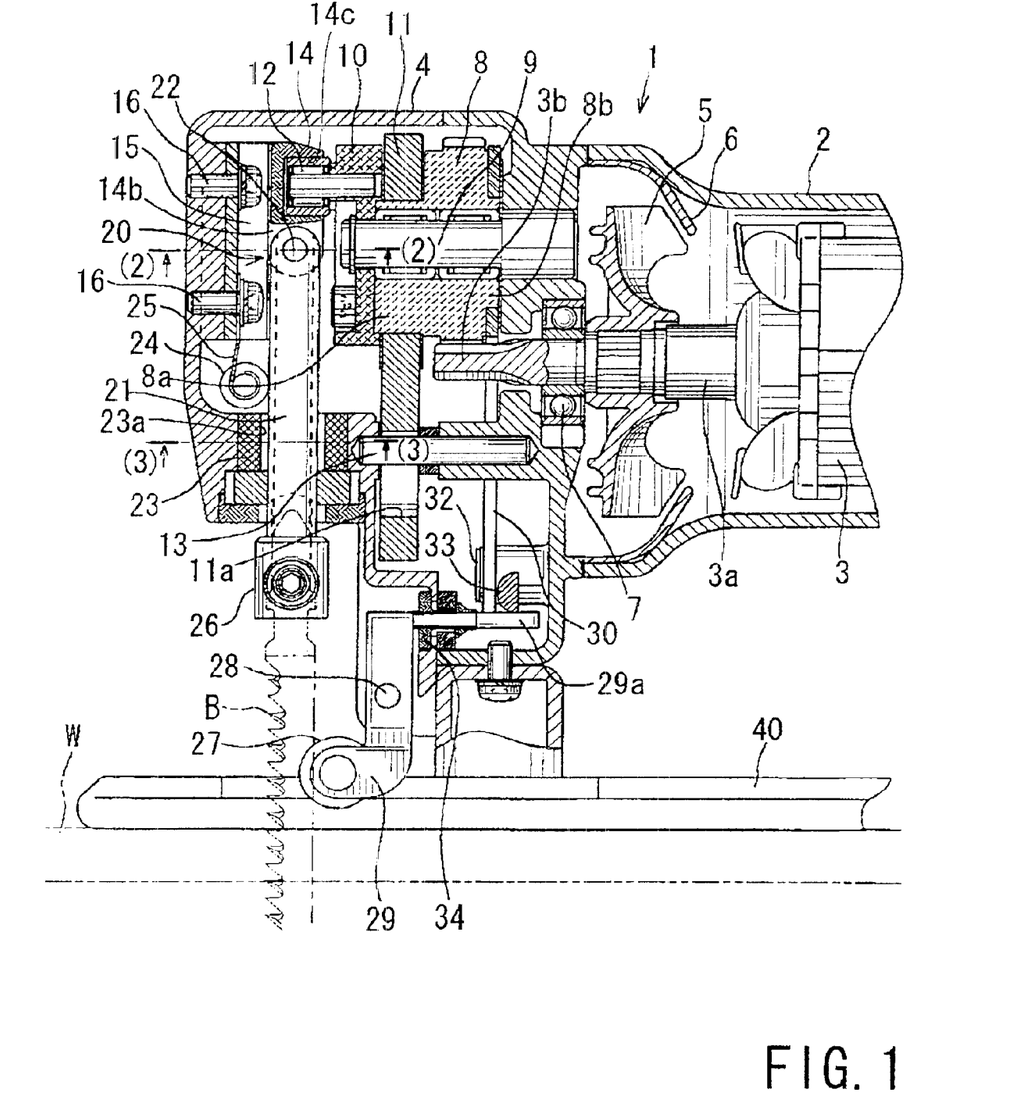
FIG. 1 is a vertical cross-section of the internal structure of a first representative jigsaw.

As shown in FIG. 1, a bush 23 may be mounted within the gear casing 4 and may serve as a guide for a lower portion of the rod 21. As shown in FIG. 3, the bush 23 may have an axial hole 23a that may be adapted to receive the rod 21. The axial hole 23a may have a rectangular cross-section. However, the length L1 of the axial hole 23a in the forward and rearward directions may be greater than the length of the corresponding side of the rod 21 so as to permit the rod 21 to move relative to the bush 23 when the rod 21 pivots in the forward and rearward directions. On the other hand, the length L2 of the axial hole 23a in the lateral direction may be substantially equal to the length of the corresponding side of the rod 21 so as to prevent rattling in the lateral direction.

A control roller 24 may be mounted on the front wall of the gear casing 4 by means of a vertical leaf spring 25 and may bias the rod 21 in the rearward direction. The upper end of the leaf spring 25 may be secured to the front wall of the gear casing 4 by means of one of the screws 16 that fixes the guide block 15 to the front wall of the gear casing 4. The control roller 24 may be attached to the lower end of the leaf spring 25. Thus, the control roller 24 always contacts the front surface of the rod 21. The leaf spring 25 applies an appropriate pressing or biasing force against the rod 21. Therefore, in order to forwardly pivot the rod 21, a force must be applied to the rod 21 against the biasing force of the leaf spring 25 as will be further explained below.

A chuck 26 may be disposed at the lower end of the rod 21 and may serve to clamp the upper end of the blade B. When the blade B is mounted, it extends downward through a shoe 40. As shown in FIG. 1, the shoe 40 may be mounted to the lower portion of the gear casing 4 and may be adapted to be placed on a workpiece W during the cutting operation.

A backup or biasing roller 27 may be disposed on the rear side of the blade B and may serve to periodically push the blade B in the forward direction. The backup roller 27 may be rotatably supported on a front end of a substantially J-shaped roller holder 29. The roller holder 29 may be mounted on the lower portion of the rear casing 4 by means of a support pin 28, so that the roller holder 29 can pivot in the forward and rearward directions. An arm 29a may extend rearward from the upper end of the roller holder 29 and may enter the gear casing 4 through a rubber bush 34 attached to the gear casing 4. Within the gear casing 4, the low end of the cam plate 30 may oppose the upper surface of the rear portion of the arm 29a. As described above, the cam plate 30 may reciprocate vertically and laterally as the intermediate gear 8 rotates. A stop 32 may extend from the inner wall of the gear casing 4 and may serve to contact the front surface of the lower end of the cam plate 30 so as to prevent the cam plate 30 from displacing in the forward direction or the direction of the thickness of the cam plate 30.

A lever 33 may be disposed on the rear side of the cam plate 30 and may be operable by an operator for adjusting the stroke of the forward and rearward movement of the backup roller 27. In FIG. 1, only a part of the lever 33 is shown in a cross-sectional view and this part may have a substantially semi-circular section. In the state shown in FIG. 1, one edge of the arc-shaped side of the lever 33 may contact the upper surface of the arm 29a so as to prevent the arm 29a from contacting the cam plate 30. Therefore, the roller holder 29 preferably does not pivot in the counterclockwise direction as viewed in FIG. 1. Thus, the roller holder 29 may be prevented from moving rearward from the position shown in FIG. 1. As a result, the rod 21 may reciprocate only vertically and may not pivot in the forward and rearward directions.

As the operator rotates the lever 33 in the clockwise direction from the position shown in FIG. 1, the edge of the arc-shaped side of the lever 33 moves upward and the flat side of the lever 33 will become inclined from the vertical position so as to be oriented downward. As a result, the lower end of the cam plate 30 may contact the arm 29a so as to pivot the roller holder 29 by an angle that may substantially correspond to the rotational angle of the lever 33 from the position shown in FIG. 1. Therefore, the rod 21 and the blade B reciprocate in the vertical direction and also in the forward and rearward directions. When the operator rotates the lever 33 by an angle of 90° from the position shown in FIG. 1, the flat side of the lever 33 may extend substantially horizontally. Thus, the pivotable angle of the roller holder 29 or the stroke of the forward and rearward directions of the backup roller 27 will be maximized Thus, when the lever 33 rotates from the position shown in FIG. 1, the lower end of the cam plate 30 may apply a downward pressing or biasing force to the upper end of the arm 29a during the period of downward movement of the lower end of the cam plate 30. Therefore, the arm 29a may move downward in response to the lower end position of the cam plate 30. As noted above, the position of the cam plate 30 may periodically change as the intermediate gear 8 rotates. Thereafter, the holder 29 may pivot in the clockwise direction around the support pin 28. As a result, the backup roller 27 will apply a pressing or biasing force to the blade B so as to pivot the blade B forward against the biasing force applied by the control roller 24.

During the period of upward movement of the lower end of the cam plate 30, the arm 29a also may follow this movement, because the control roller 24 biases the blade B in the rearward direction and therefore biases the holder 29 to pivot in the counterclockwise direction.

The lower end position of the cam plates 30, as well as the vertical position of the guide roller 12, may change in response to the rotational angle or position of the intermediate gear 8. Therefore, the vertical movement of the blade B and the forward and rearward movement of the blade B may be synchronized, so that the blade B may move forward during the upward movement of the same, thereby generating orbital movement. As a result, the blade B can effectively cut the workpiece W with the aid of the pressing or biasing force applied to the blade B by the backup roller 27.

In this first representative embodiment, the crank disk 10, the guide roller 12 and the slider 14 may constitute a motion conversion mechanism for converting the rotation of the motor 3 into the reciprocating movement of the blade B.

The operation of the first representative embodiment will now be described. When the motor 3 is started, the intermediate gear 8 and the crank disk 10 rotate. As the crank disk 10 rotates, the guide roller 12 revolves around the support shaft 9, so that the slider 14 is forced to reciprocate vertically due to the vertical component of the revolution of the guide roller 12. Therefore, the rod 21 and the blade B reciprocate vertically together with the slider 14.

When the operator rotates the lever 33 in the clockwise direction from the position shown in FIG. 1, the cam plate 30 reciprocates the backup roller 27 in the forward and rearward directions as the intermediate gear 8 rotates. As the backup roller 27 moves forward, it presses the blade B forward against the biasing force of the control roller 24, so that the rod 21 pivots forward about the support pin 22. On the other hand, as the backup roller 27 moves rearward, the control roller 24 biases to pivot the rod 21 rearward. As a result, the blade B moves rearward.

During one rotation of the intermediate gear 8, the rod 21 reciprocates by one stroke in the vertical direction and also reciprocates by one revolution in the forward and rearward directions. Because the first eccentric boss 8a and the second eccentric boss 8b are displaced from each other by an angle of 180°, the rod 21 or the blade B may move rearward as it moves downward. In addition, the rod 21 or the blade B may move forward as it moves upward. As a result, when considering the portion of the blade B that contacts the workpiece, the blade B may move or orbit in a clockwise direction along a substantially elliptical path within the vertical plane. Further, the workpiece W may be cut by the combined reciprocating movements of the blade B. During the cutting operation, the blade B is pressed forward against the workpiece W while the shoe 40 of the jigsaw 1 is placed on the workpiece W as shown in FIG. 1. In a practical cutting operation, the rod 21 may be caused to move rearward due to the cutting resistance from the workpiece W in addition to the biasing force of the control roller 24.

In this representative embodiment, the guide block 15 supports the slider 14 such that the slider 14 can move only in the vertical direction. The slider 14 supports the rod 21 such that the rod 21 can pivot in the forward and rearward directions independently of the vertical movement of the slider 14. Therefore, the slider 14 can be prevented from moving or inclining in the forward and rearward directions, so that the slider 14 may be prevented from inclining relative to the guide roller 12. As a result, the clearance between the guide roller 12 and the inner surface of the horizontal recess 14c of the slider 14, and in particular the clearance between the guide roller 12 and the vertical walls of the horizontal recess 14c, may be set to be as small as possible. Therefore, the guide roller 12 can smoothly move along the horizontal recess 14c, so that vibrations and noise caused by the motion conversion mechanism 20 may be considerably reduced. Consequently, operator fatigue may be reduced during the cutting operation.

In addition, the slider 14 is vertically and slidably supported by the guide block 15 by means of the lateral edges 14a that are received by the respective guide recesses 15a of the guide block 15 without any rattling. Therefore, rotation or twisting of the rod 21 about its axis can be reliably prevented and the rigidity of the rod 21 against torsional forces may be improved. Therefore, the blade B preferably does not rotate or twist during the cutting operation and undesirable deflection from the intended cutting path may be reliably prevented.

Further, the rod 21 is formed as a prism with a square cross-section, and the lower portion of the rod 21 is inserted into the support hole 23a of the bush 23. Therefore, rotation of the rod 21 can be further reliably prevented, and the rigidity of the rod 21 against torsional forces may be further improved. As a result, the cutting operation can be accurately performed, while the blade B is reliably prevented from rotating or twisting.

The above representative embodiment may be modified in various ways. A second representative reciprocating cutting tool is one example of a modification of the first representative embodiment and will now be described with reference to FIGS. 4 and 5. The second representative embodiment is different from the first representative embodiment only in the slider support structure. In other respects, the second representative embodiment is substantially the same as the first representative embodiment. Therefore, in FIGS. 4 and 5, like members are given the same reference numerals as FIGS. 1 to 3.

Figure 4:
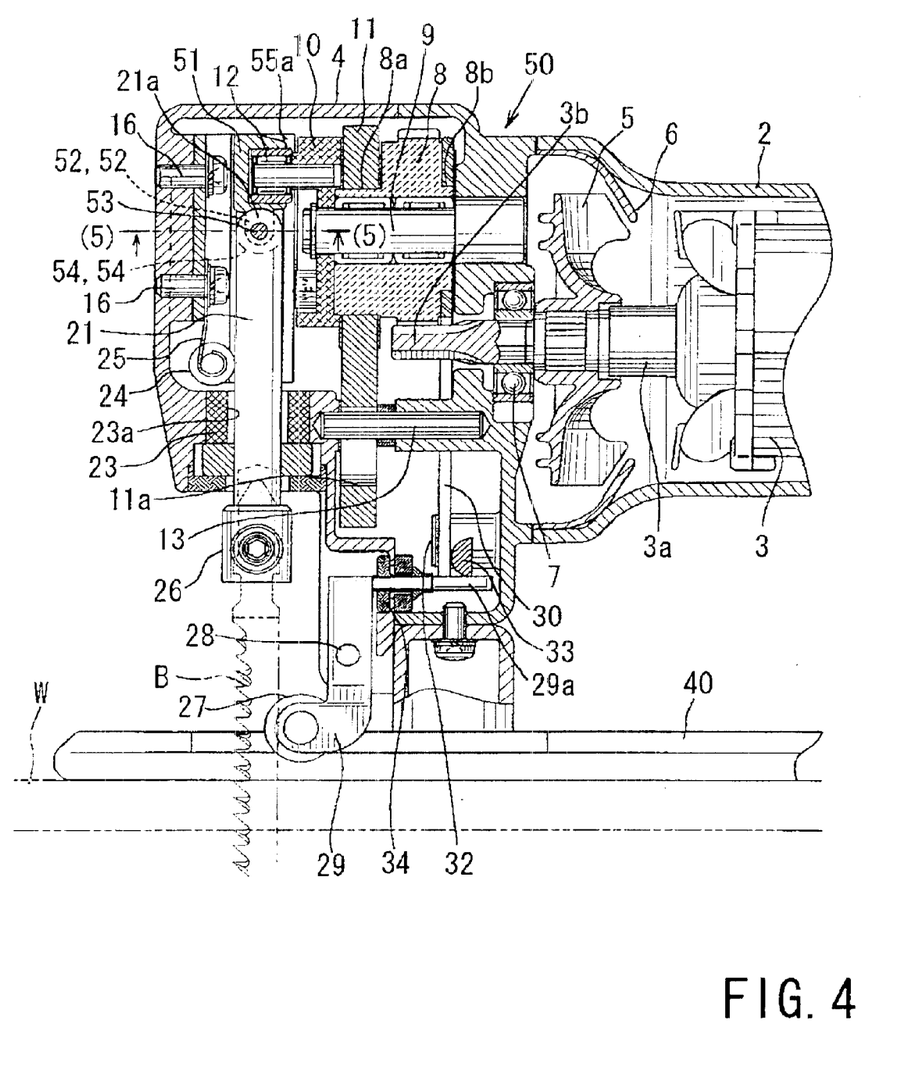
FIG. 4 is a vertical cross-section of the internal structure of a second representative jigsaw.
Figure 5:
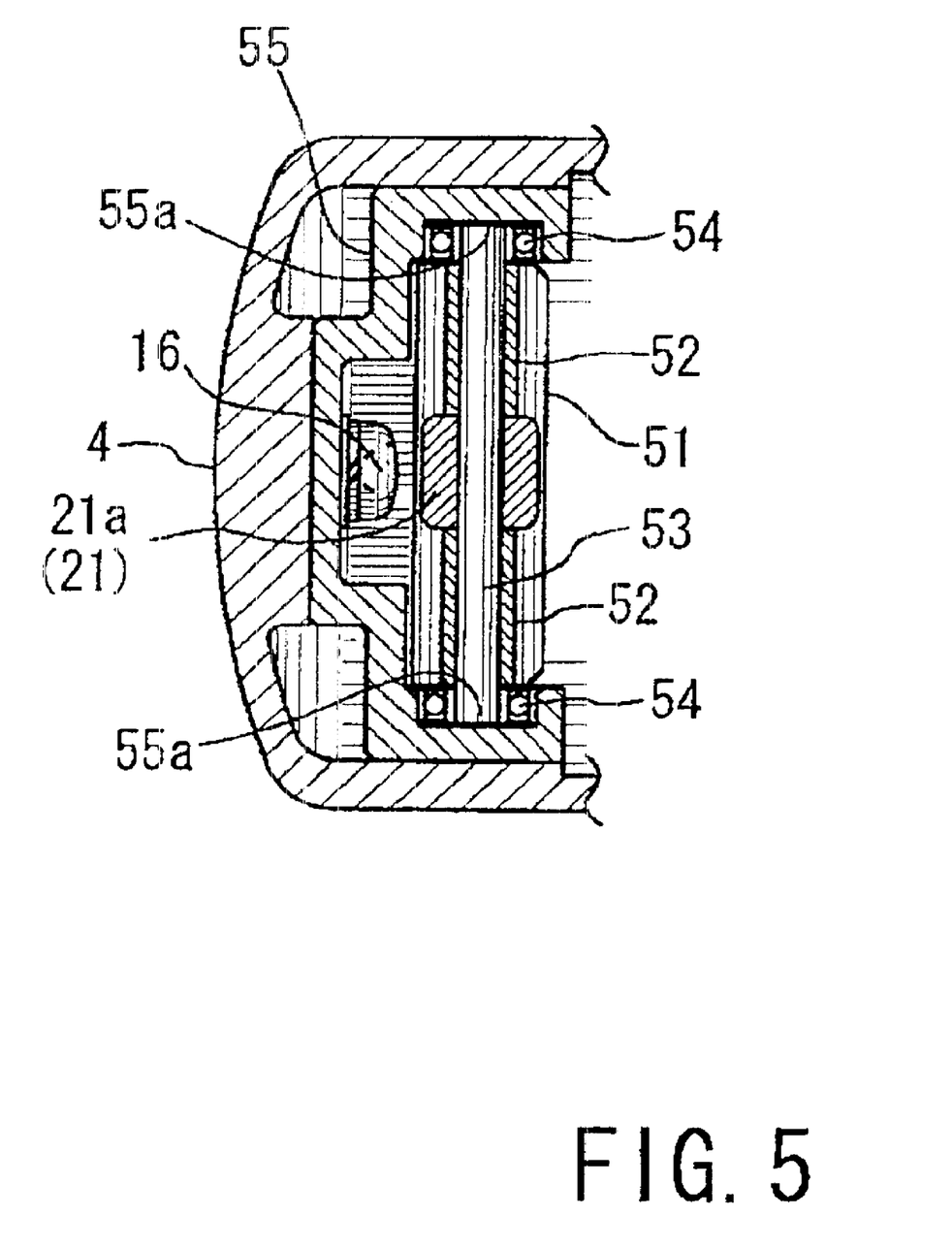
FIG. 5 is a horizontal cross-sectional view taken along line (5)—(5) in FIG. 4 and showing a representative arrangement for supporting a slider and also showing a representative arrangement for supporting a rod on the slider.

As shown in FIGS. 4 and 5, a second representative jigsaw 50 may have a slider 51 that includes a pair of cylindrical sleeves 52. The cylindrical sleeves 52 may be formed with the lower portion of the slider 51 and the respective axes of the cylindrical sleeves 52 may be aligned with each other. The upper end 21a of the rod 21 may be inserted between the sleeves 52. A pin 53 may be inserted through both sleeves 52 and the upper end 21a of the rod 21. Therefore, the rod 21 can pivot in the forward and rearward directions relative to the slider 51 around the support pin 53. Both ends of the support pin 53 may extend outward from the respective ends of the sleeves 52. Bearings 54 may be mounted on both ends of the support pin 53.

The respective ends of the support pin 53 may engage the respective guide recesses 55a through the respective bearings 54. The guide recesses 55a may be formed in the guide block 55 and may oppose each other. In the same manner as the guide block 15 of the first representative embodiment, the guide block 55 may be secured to the front wall of the gear casing 4 by means of the screws 16. The bearings 54 may vertically slidably engage the respective guide recesses 55a As the bearings 54 move along the respective guide recesses 55a, the support pin 53 may translate parallel in the vertical direction. Therefore, the slider 51 and the rod 21 may reciprocate vertically.

According to the second representative jigsaw 50, the crank disk 10, the guide roller 12 and the slider 51 may constitute a motion conversion mechanism that converts the rotation of the motor 3 into vertical reciprocating movement of the rod 21.

Also in this second representative embodiment, the guide roller 12 may revolve around the support shaft 9 as the crank disk 10 rotates, and the slider 51 may vertically reciprocate due to the vertical component of the revolution of the guide roller 12. The rod 21 may be supported by the slider 51 by means of the support pin 53 such that the rod 21 can reciprocate in the forward and rearward directions. Thus, the slider 51 may reciprocate only vertically and is prevented from moving in the forward and rearward directions as in known jigsaws. As a result, the same operation and effects as in the first representative embodiment may be attained.

In addition, because the slider 51 of the second representative embodiment is supported by the guide block 55 by means of the bearings 54 on both ends of the support pin 53, rotational or torsional force around the axis of the rod 21 is not generated. Further, because the rod 21 has a prism shape with a square cross-section and is inserted into the support hole 23a (rectangular hole) of the bush 23, the rod 21 itself is prevented from rotating, as in the first representative embodiment. Therefore, the blade B preferably does not twist during the cutting operation, and undesirable deflection from the intended cutting path may be reliably prevented. Further, increases in the temperature of the blade B, e.g., due to friction against the workpiece W, may be minimized.

Also, the second representative embodiment may be modified in various ways. For example, although the bearings 54 are ball bearings in this representative embodiment, cylindrical bushes or metal bearings may be used in place of the ball bearings. In addition, the bearings 54 may be eliminated, and both ends of the support pin 53 may directly engage the respective engagement recesses 55a of the guide block 55.

Further, although the rod 21 has a square cross-section in the above representative embodiments, the rod 21 may have a rectangular cross-section or other polygonal cross-sections. In addition, the rod 21 may have a circular or elliptical cross-section. In any case, the support hole 23a of the bush 23 may have a configuration that is elongated in the forward and rearward directions.

What is claimed is:

1. A reciprocating cutting tool, comprising:
   a motor generating a rotational output that is utilized to drive a blade in an orbital path with respect to a workpiece,
   a motion conversion mechanism coupled to the motor,
   a slider coupled to or incorporated within the motion conversion mechanism, wherein the slider linearly reciprocates within a first plane when the motor is driven, but substantially does not move in a second plane that is substantially perpendicular to the first plane and
   a blade holder shaft, a means for pivotally coupling said blade holder shaft to the slider, wherein the blade holder shaft can reciprocate in the first plane and wherein said means allows said blade holder shaft to reciprocate in the second plane, the second plane corresponds to a plane for cutting the workpiece, and whereby orbital cutting motion of the blade in the second plane is generated during a cutting operation.

2. A cutting tool as in claim 1, wherein the first plane comprises a vertical cutting direction with respect to a workpiece and the second plane comprises (i) a forward direction for pressing the blade against the workpiece during the cutting operation and (ii) a rearward direction opposite to the forward direction.

3. A cutting tool as in claim 2, wherein said means is a support pin that pivotally couples the slider to the blade holder shaft, the support pin being disposed between the slider and the blade.

4. A cutting tool as in claim 3, further comprising a pair of bearings rotatably supporting the support pin.

5. A cutting tool as in claim 2, wherein the blade holder shaft is prevented from rotating twisting around its longitudinal axis.

6. A cutting tool as in claim 5, further comprising a fixed bush having a support hole, the blade holder shaft extending through the support hole, thereby being prevented from rotating relative to the bush, wherein a clearance is defined between the blade holder shaft and an inner wall of the support hole, thereby permitting the blade holder shaft to move relative to the bush in the second plane.

7. A cutting tool as in claim 6, wherein the support hole has a substantially non-circular configuration, and the blade holder shaft has a substantially non-circular outer peripheral surface that substantially corresponds to the configuration of the support hole.

8. A cutting tool as in claim 6, wherein the support hole and the peripheral surface of the blade holder shaft have a rectangular configuration.

9. A cutting tool as in claim 1, further including a biasing roller contacting the blade or blade holder shaft in the second plane, the biasing roller being arranged and constructed to reciprocally move in the second plane in synchronism with the reciprocative movement of the slider in the first plane.

10. A cutting tool as in claim 1, wherein the motion conversion mechanism comprises:
   a crank disk rotatably driven by the motor about a rotational axis,
   a guide roller mounted on the crank disk, the guide roller having a roller axis that is displaced from the rotational axis of the crank disk, wherein the guide roller revolves around the rotational axis of the crank disk as the crank disk rotates, wherein the slider has an engagement recess that slidably retains the guide roller, the engagement recess extending substantially in parallel with the first plane, and
   a guide block slidably receiving the slider.

11. A cutting tool as in claim 10, further comprising a housing for receiving and supporting the motion conversion mechanism and the slider, wherein the guide block is fixedly attached to the housing.

12. A cutting tool as in claim 11, wherein the slider includes opposite lateral edges that extend substantially in parallel with the first plane, and the guide block further includes a pair of guide recesses that receive the respective lateral edges of the slider without any substantial clearance.

13. A cutting tool as in claim 12, wherein the first plane comprises a vertical cutting direction with respect to a workpiece and the second plane comprises (i) a forward direction for pressing the blade against the workpiece during the cutting operation and (ii) a rearward direction opposite to the forward direction.

14. A cutting tool as in claim 13, wherein a support pin pivotally couples the slider to the blade holder shaft, the support pin being disposed between the slider and the blade.

15. A cutting tool as in claim 14, further comprising a pair of bearings rotatably supporting the support pin.

16. A cutting tool as in claim 14, further comprising a fixed bush, a support hole having a substantially non-circular configuration being defined within the bush, wherein the blade holder shaft has a substantially non-circular outer peripheral surface that substantially corresponds to the configuration of the support hole, the blade holder shaft extending through the support hole, thereby being prevented from rotating relative to the bush, wherein a clearance is defined between the blade holder shaft and an inner wall of the support hole, thereby permitting the blade holder shaft to move relative to the bush in the second plane.

17. A cutting tool as in claim 1, wherein the slider is slidably received in a guide block, wherein the slider can slide with respect to the guide block in the first plane, but the guide block prevents the slider from inclining or rattling in the second plane.

18. A cutting tool as in claim 17, further comprising a housing for receiving and supporting the motion conversion mechanism and the slider, wherein the guide block is fixedly attached to the housing.

19. A cutting tool as in claim 18, wherein the slider includes opposite lateral edges that extend substantially in parallel with the first plane, and the guide block further includes a pair of guide recesses that receive the respective lateral edges of the slider without any substantial clearance.

20. A reciprocating cutting tool comprising:
   a motor generating a rotational output that is utilized to drive a blade in an orbital path with respect to a workpiece,
   first means for converting the rotational output of the motor into linear reciprocating movement in a first plane, and
   second means for transmitting the linear reciprocating movement in the first plane to the blade, the second means pivotally coupled to the first means by a third means and fixedly coupled to the blade, wherein the second means can reciprocate in the first plane and the third means allows the second means to reciprocate in a second plane that is substantially perpendicular to the first plane, wherein the first means substantially does not move in the second plane and the second plane corresponds to a plane in which the workpiece is cut.

21. A reciprocating cutting tool as in claim 20, further comprising means for biasing the second means or the blade in the second plane.

22. A reciprocating cutting tool as in claim 20, further comprising means for preventing the second means from rotating or twisting during a cutting operation.

23. A reciprocating cutting tool as in claim 20, wherein the first plane comprises a vertical cutting direction with respect to the workpiece and the second plane comprises (i) a forward direction for pressing the blade against the workpiece during the cutting operation and (ii) a rearward direction opposite to the forward direction.

24. A reciprocating cutting tool as in claim 20, wherein the first means comprises a slider slidably received in a guide block, wherein the slider is arranged and constructed to slide with respect to the guide block in the first plane without inclining or rattling in the second plane.

25. A reciprocating cutting tool as in claim 24, further comprising a housing for receiving and supporting at least the motor and the first means, wherein the guide block is fixedly attached to the housing.

26. A reciprocating cutting tool as in claim 25, wherein the slider has opposing lateral edges that extend substantially in parallel with the first plane, and the guide block has a pair of guide recesses that receive the respective lateral edges of the slider without any substantial clearance.

27. A reciprocating cutting tool as in claim 20, further comprising a support pin that pivotally couples the first means to the second means.

28. A reciprocating cutting tool as in claim 27, further comprises at least one bearing that rotatably supports the support pin.

29. A reciprocating cutting tool as in claim 20, wherein the second means comprises a blade holder shaft that is prevented from rotating around a longitudinal axis of the blade holder shaft.

30. A reciprocating cutting tool as in claim 29, further comprising a fixed bushing having a support hole, the blade holder shaft extending through the support hole and thereby being prevented from rotating relative to the bushing, wherein a clearance is defined between the blade holder shaft and an inner wall of the support hole so as to permit the blade holder shaft to move relative to the bushing in the second plane.

31. A reciprocating cutting tool as in claim 30, wherein the support hole of the bushing has a substantially non-circular configuration, and a rod or the blade holder shaft has a substantially non-circular outer peripheral surface that substantially corresponds to the configuration of the support hole.

32. A reciprocating cutting tool as in claim 30, wherein the support hole of the bushing and the peripheral surface of the blade holder shaft have a rectangular configuration.

33. A reciprocating cutting tool as in claim 20, wherein the first means comprises:
   a crank disk rotatably driven by the motor about a rotational axis, a guide roller mounted on the crank disk, the guide roller having a roller axis that is displaced from the rotational axis of the crank disk, wherein the guide roller revolves around the rotational axis of the crank disk as the crank disk rotates, a slider having an engagement recess that slidably retains the guide roller, the engagement recess extending substantially in parallel with the first plane and a guide block slidably receiving the slider.

34. A reciprocating cutting tool as in claim 33, further comprising a housing for enclosing at least the motor and the first means, wherein the guide block is fixedly attached to the housing and the guide block receives the slider without any substantial clearance.

35. A reciprocating cutting tool as in claim 34, wherein the slider has opposing lateral edges that extend substantially in parallel with the first plane, and the guide block has a pair of guide recesses that receive the respective lateral edges of the slider without any substantial clearance.

36. A reciprocating cutting tool as in claim 20, further including a biasing roller contacting the blade in the second plane, the biasing roller being arranged and constructed to reciprocally move in the second plane in synchronism with the reciprocating movement of the first means in the first plane.

37. A reciprocating cutting tool comprising:

a motor generating a rotational output, a slider slidably coupled to the motor, the slider being arranged and constructed to reciprocate substantially only linearly in a first direction, a rod, a means for coupling the rod to the slider, the rod is movable with the slider in the first direction and the means allows the rod to move in a second direction that is different from the first direction, wherein the rod is movable in the second direction independently of the movement of the slider in the first direction and the second direction corresponds to a cutting plane of a workpiece that will be cut by the reciprocating cutting tool and a blade mounting device fixedly attached to the rod.

38. A reciprocating cutting tool as in claim 37, wherein the second direction is substantially perpendicular to the first direction.

39. A reciprocating cutting tool as in claim 38, further including a guide block slidably receiving and guiding the slider, wherein the slider is arranged and constructed to slide along the guide block in the first direction and the guide block is arranged and constructed to prevent the slider from inclining or tilting relative to the first direction.

40. A reciprocating cutting tool as in claim 39, further comprising a housing supporting and enclosing at least the motor and the slider, wherein the guide block is fixedly attached to the housing.

41. A reciprocating cutting tool as in claim 40, wherein the slider has opposing lateral edges that extend substantially in parallel to the first direction, and a pair of guide recesses are formed in the guide block, which guide recesses receive the respective lateral edges of the slider without substantial clearance.

42. A reciprocating cutting tool as in claim 37, wherein the slider supports the rod such that the rod can pivot in the second direction.

43. A reciprocating cutting tool as in claim 37, further comprising a support pin arranged and constructed to permit the rod to pivot relative to the slider.

44. A reciprocating cutting tool as in claim 43, further comprising at least one bearing rotatably supporting the support pin.

45. A reciprocating cutting as in claim 44, wherein opposite lateral edges of the slider define the at least one bearing.

46. A reciprocating cutting tool as in claim 37, wherein the rod is prevented from rotating around a longitudinal axis of the rod.

47. A reciprocating cutting tool as in claim 37, further comprising a fixed bush having a support hole, the rod extending through the support hole, thereby preventing the rod from rotating or twisting relative to the bush, and a clearance is provided between the rod and an inner wall of the support hole, which clearance permits the rod to move relative to the bush in the second direction.

48. A reciprocating cutting tool as in claim 47, wherein the support hole of the bush has a non-circular configuration, and the rod has a non-circular outer peripheral surface that corresponds to the configuration of the support hole.

49. A reciprocating cutting tool as in claim 47, wherein the support hole of the bush and a peripheral surface of the rod have a rectangular configuration.

50. A reciprocating cutting tool as in claim 37, further comprising means for converting rotational movement generated by the motor into the linear reciprocating movement of the slider.

51. A reciprocating cutting tool as in claim 37, further comprising:

a crank disk adapted to be rotatably driven by the motor, a guide roller mounted on the crank disk, the guide roller having a roller axis that is displaced from the rotational axis of the crank disk, whereby the guide roller revolves around the rotational axis of the crank disk as the crank disk rotates, wherein an engagement recess is defined within the slider and engages the guide roller, the engagement recess extending substantially perpendicular to the first direction within a plane that is parallel to a plane of revolution of the guide roller and a guide block slidably receiving the slider without substantial clearance.

52. A reciprocating cutting tool as claim 37, further including a backup roller that contacts the rod, or a blade mounted in the blade mounting device, in the second direction, the backup roller being arranged and constructed to reciprocally move in the second direction in synchronism with the reciprocating movement of the slider in the first direction.

53. A reciprocating cutting tool as in claim 37, wherein the reciprocating cutting tool is a jigsaw.

* * * * *